United States Patent [19]

Hayashi et al.

[11] Patent Number: 4,660,683

[45] Date of Patent: Apr. 28, 1987

[54] BRAKE DEVICE FOR VEHICLES

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 737,032

[22] Filed: May 22, 1985

[30] Foreign Application Priority Data

May 22, 1984 [JP] Japan .................................. 59-103179
May 26, 1984 [JP] Japan .................................. 59-106917

[51] Int. Cl.⁴ ........................... B60T 1/06; B60T 8/02
[52] U.S. Cl. ................................. 188/18 A; 192/4 R; 188/181 R; 188/344; 303/2; 303/113; 280/276
[58] Field of Search ............ 188/18 A, 181 R, 181 A, 188/344; 280/276, 278, 279, 286; 303/99, 104, 106, 107, 101, 102, 113-119, 2, 3; 192/4 R, 4 A

[56] References Cited

U.S. PATENT DOCUMENTS

| Re. 31,387 | 9/1983 | Bayliss .................................. 303/115 |
| --- | --- | --- |
| 2,818,244 | 12/1957 | Ropar ....................................... 264/1 |
| 2,920,924 | 1/1960 | Reswick et al. ......................... 303/24 |
| 3,046,060 | 7/1962 | Stager et al. ............................ 303/21 |
| 3,403,761 | 10/1968 | Rockwell ............................... 188/265 |
| 3,667,816 | 6/1972 | Harned .................................... 303/21 |
| 3,731,767 | 5/1973 | Lefort ..................................... 188/72.2 |
| 3,829,166 | 8/1974 | von Loewis of Menar et al. ..................................................... 303/21 CG |
| 4,036,331 | 7/1977 | Hayashi et al. ....................... 188/187 |
| 4,046,427 | 9/1977 | Baynes et al. ......................... 303/115 |
| 4,225,020 | 9/1980 | Blomberg ......................... 188/181 R |
| 4,260,170 | 4/1981 | Terai et al. ............................ 280/286 |
| 4,260,201 | 4/1981 | Farr ........................................ 303/99 |
| 4,281,881 | 8/1981 | Mekosh, Jr. et al. ....... 188/181 A X |
| 4,340,258 | 7/1982 | Farr ....................................... 303/115 |
| 4,350,396 | 9/1982 | Mortimer ............................. 303/115 |
| 4,353,440 | 10/1982 | Farr ................................... 188/181 A |
| 4,354,715 | 10/1982 | Farr et al. ............................. 303/116 |
| 4,355,849 | 10/1982 | Wilson ................................. 303/116 |
| 4,365,538 | 12/1982 | Andoh ....................................... 91/1 |
| 4,377,221 | 3/1983 | Farr ................................... 188/181 A |
| 4,381,049 | 4/1983 | Crossman ........................... 188/72.7 |
| 4,381,125 | 4/1983 | Wilson ................................. 303/116 |

(List continued on next page.)

FOREIGN PATENT DOCUMENTS

| 0808191 | 4/1951 | Fed. Rep. of Germany ...... 280/276 |
| --- | --- | --- |
| 0170070 | 1/1952 | Fed. Rep. of Germany ...... 280/276 |
| 0630379 | 12/1961 | Italy ..................................... 280/276 |
| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 2069642 | 8/1981 | United Kingdom ............ 188/181 R |
| 2069641A | 8/1981 | United Kingdom . |
| 2070166 | 9/1981 | United Kingdom ........... 188/181 A |
| 2109494A | 6/1983 | United Kingdom . |

OTHER PUBLICATIONS

SAE Technical Series 830484, pp. 1-8, "Performance of Antilock Brakes with Simplified Control Technique", by Makoto Satoh & Shuji Shiraishi, 1983.
SAE Section 5: Technical Sessions, pp. 903-909, "Performance of a Simplified Control Technique for Antilock Brakes," by Makoto Satoh & Shuji Shiraishi, 1983.

Primary Examiner—Douglas C. Butler
Attorney, Agent, or Firm—Lyon & Lyon

[57] ABSTRACT

A brake device for vehicles comprises a master cylinder, a wheel brake adapted to be operated by the output hydraulic pressure from the master cylinder to apply a braking force to a wheel, and an antilock control unit, having therein an inertia type wheel angular deceleration sensor driven by the wheel through a transmission device and adapted for controlling the output hydraulic pressure from the master cylinder in accordance with the output of the sensor, the antilock control unit being carried on the support system for the wheel. Defined on one side of the wheel is a recess which is concave toward the other side of the wheel from the central rotational plane of the rim of the wheel, and the antilock control unit and transmission device are disposed in the recess.

5 Claims, 8 Drawing Figures

U.S. PATENT DOCUMENTS

| | | | |
|---|---|---|---|
| 4,387,934 | 6/1983 | Farr | 303/116 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,422,695 | 12/1983 | Farr | 303/115 |
| 4,428,624 | 1/1984 | Farr | 303/116 |
| 4,436,348 | 3/1984 | Farr | 303/115 |
| 4,456,099 | 6/1984 | Kawaguchi | 188/71.6 |
| 4,456,309 | 6/1984 | Rath | 303/10 |
| 4,457,563 | 7/1984 | Farr | 303/92 |
| 4,474,413 | 10/1984 | Farr | 303/116 |
| 4,511,156 | 4/1985 | Offenstadt | 180/219 X |

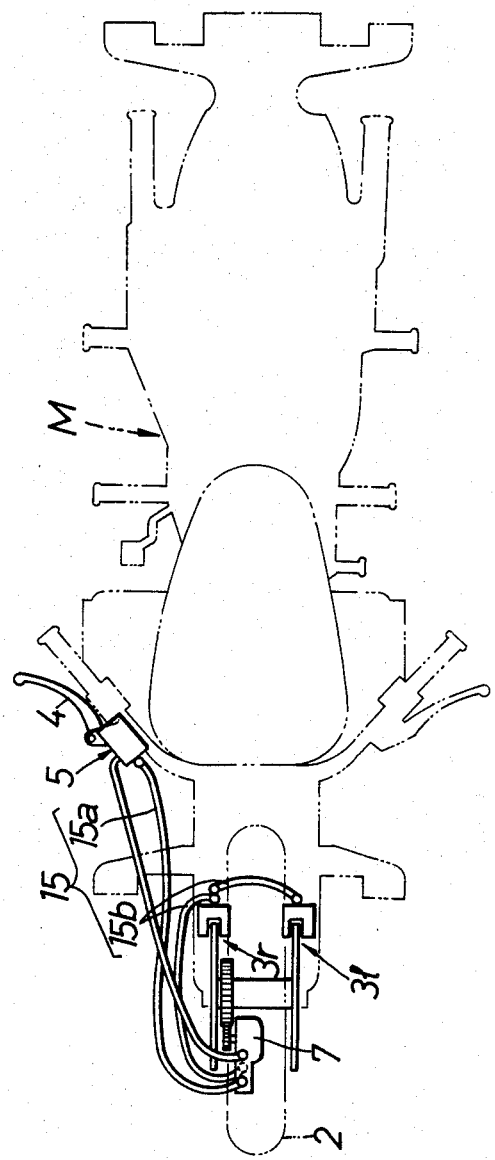

BRAKE DEVICE FOR VEHICLES

BACKGROUND OF THE INVENTION

1. Field of the Invention

The present invention relates to a brake device for vehicles such as motorcycles and automobiles and more particularly, to such a brake device comprising a master cylinder, a wheel brake adapted to be operated by the output hydraulic pressure from the master cylinder to apply a braking force to a wheel, and an antilock control unit, having therein an inertia type wheel angular deceleration sensor driven by the wheel through a transmission device and adapted for controlling the output hydraulic pressure from the master cylinder in accordance with the output of the sensor, the antilock control unit being carried on a support system for the wheel.

2. Description of the Prior Art

Such brake devices are already known as described in Japanese patent publication laid-open No. 120440/1981.

In such conventional brake devices, an antilock control unit and a transmission device are disposed outside a wheel. For this reason, it is disadvantageously necessary to provide covering means for the antilock control unit and the transmission device, resulting in a complicated and large-sized structure.

SUMMARY OF THE INVENTION

It is therefore an object of the present invention to provide a brake device for vehicles wherein the above disadvantage is overcome.

This object is accomplished according to the present invention by providing a brake device wherein defined on one side of a wheel is a recess which is concave on the other side from the central rotational plane of a rim of the wheel, and an antilock control unit and a transmission device are disposed in this recess.

With such arrangement, since the antilock control unit and the transmission device are contained in the recess, their mounting is facilitated and further, the wheel itself serves as covering means for the antilock control unit and the transmission device. This enables the influence of damage by external conditions on the antilock control unit and the transmission device to be diminished even without specially providing covering means, and can contribute to the simplification and compactness in structure of the brake device.

The above and other objects, features and advantages of the present invention will become apparent from the following description of preferred embodiments taken in conjunction with the accompanying drawings in which:

FIG. 1 is a side view of the front portion of a motorcycle equipped with a brake device according to the present invention;

FIG. 2 is a vertical sectional front view of FIG. 1;

FIG. 3 is an enlarged plan view in vertical section of an antilock control unit shown in FIG. 2;

FIGS. 4 and 5 are sectional views taken along the lines IV—IV and V—V of FIG. 3, respectively;

FIGS. 6 to 8 illustrate another embodiment of the present invention;

FIG. 6 is a schematic plan view of a motorcycle equipped with a brake device of the present invention;

FIG. 7 is an enlarged side view of the essential part of FIG. 6; and

FIG. 8 is a rear view in vertical section of the essential part of FIG. 7.

DESCRIPTION OF THE PREFERRED EMBODIMENTS

The present invention will now be described in more detail by way of preferred embodiments with reference to the accompanying drawings.

Figure 1:
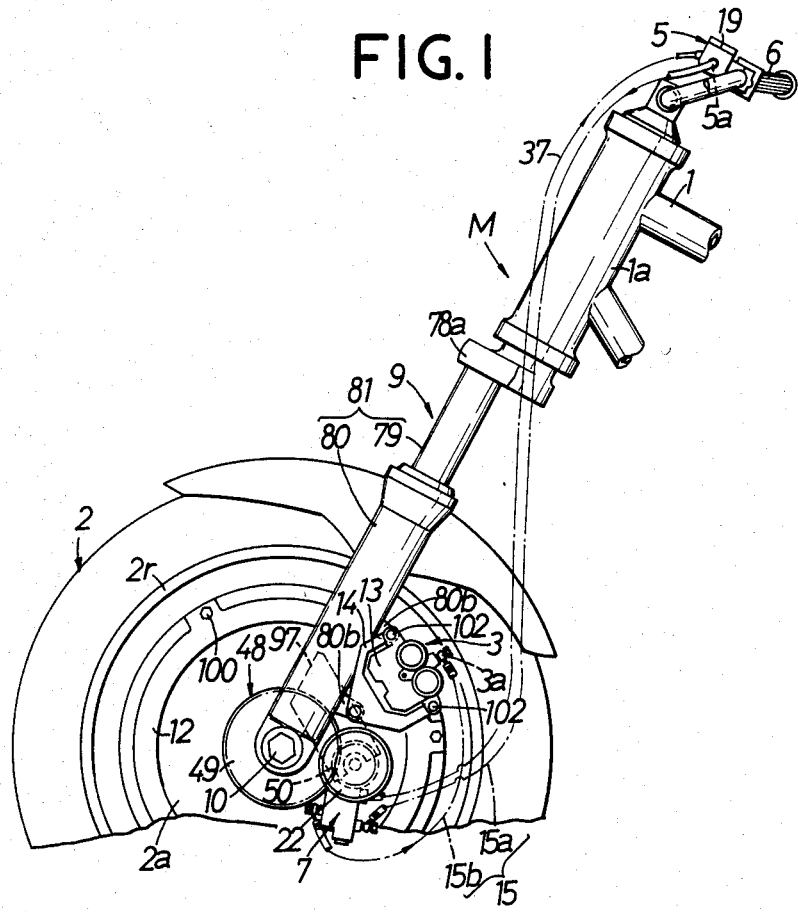
FIGS. 1 to 5 illustrate one embodiment of the present invention.
Figure 2:
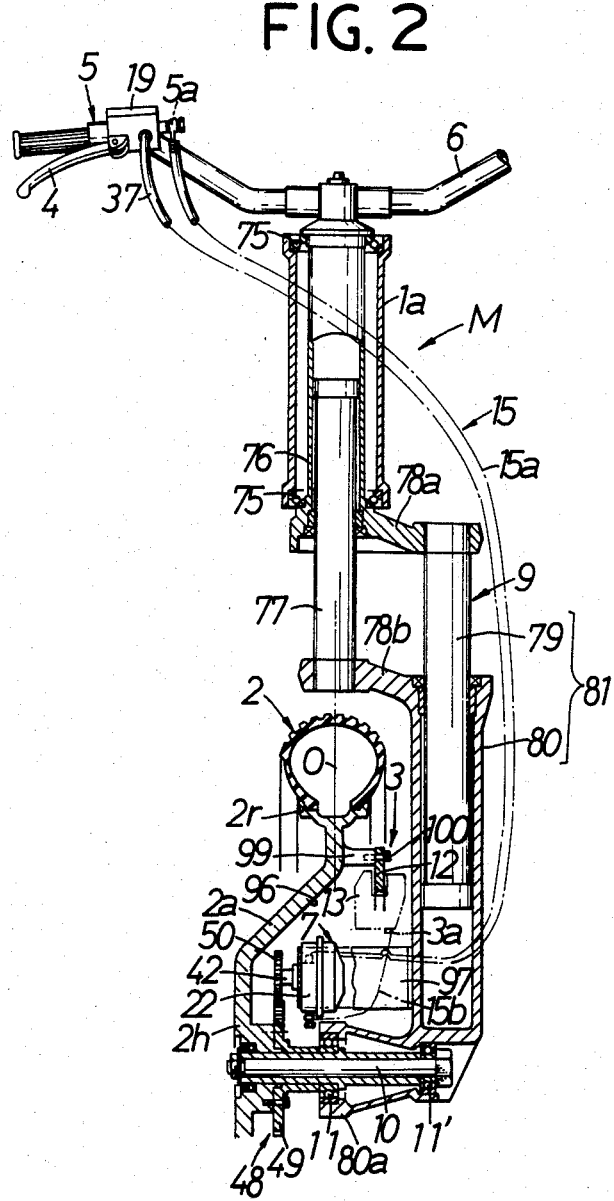

Referring first to FIGS. 1 and 2, there is shown a brake device for a front wheel 2 in a motorcycle M, which comprises a master cylinder 5 mounted on a steering handle 6 and adapted to be operated by a brake lever 4, a front wheel brake 3 adapted to receive an output hydraulic pressure from the master cylinder 5 to apply a braking force to the front wheel 2, and an antilock control unit 7, disposed in a hydraulic pressure conduit 15 connecting an output port 5a of the master cylinder 5 with an input port 3a of the front wheel brake 3, for controlling the output hydraulic pressure from the master cylinder 5.

A front fork 9, which is a support system for the wheel 2, is steerably connected to a head pipe 1a formed on the front end of a vehicle body frame 1 of the motorcycle M.

The front fork 9 comprises a hollow steering stem 76 rotatably journaled on the head pipe 1a through a pair of upper and lower bearings 75, a guide pipe 77 slidingly fitted in the bore of the hollow steering stem 76 from the below, a fork pipe 79 secured to the lower end of the steering stem 76 via an upper bridge 78a extending to one side thereof in the lateral direction of the frame 1, and a bottom case 80 secured to the lower end of the guide pipe 77 through a lower bridge 78b extending to one side thereof similarly as the upper bridge 78a. The steering handle 6 is mounted on the upper end of the steering stem 76.

The fork pipe 79 and the bottom case 80 are engaged with each other relatively slidably to constitute an expandable and retractable fork leg 81, in the interior of which a suspension spring and a damper mechanism (both not shown) are provided as in the prior art. The expanding or retracting movement of the fork leg 81 causes the guide pipe 77 to be expanded out of or to be retracted into the steering stem 76, so as to guide such movement and at the same time to inhibit the relative rotation of the fork pipe 79 and the bottom case 80.

The bottom case 80 is integrally formed at its lower end with a bearing bracket 80a which extends toward the axis of the steering stem 76 and carries a base end-side half part of the axle 10 through a pair of bearings 11 and 11'. In this manner, the front fork 9 is constituted in a cantilevered fashion.

The front wheel 2 is disposed directly below the guide pipe 77 adjacent the fork leg 81, with a rim 2r thereby having a central rotational plane O disposed so as to include the axis of the steering stem 76. A hub 2h is integrally connected to the rim 2r through a bowl-shaped arm 2a, greatly bulged toward the opposite side to the fork leg 81 with respect to the central rotational plane O of the rim 2r, on the one hand, and is coupled to the fore end of the axle 10, on the other hand. Thus, defined on one side of the front wheel 2 is a deep bowl-shaped recess 96 which is opened toward the fork leg 81 and concave from the central rotational plane O.

Contained in the recess 96 are the antilock control unit 7 disposed in the vicinity of the central rotational plane O and a transmission device 48 connecting a drive shaft 42 of the unit 7 with the front wheel 2. The unit 7 has a casing 22 which is secured to one side of the bottom case 80 through a bracket 97.

The transmission device 48 is comprised of a drive gear 49 secured on the inner end of the hub 2h of the front wheel 2 and a driven gear 50 secured on the drive shaft 42 and meshed with the drive gear 49. The gear ratio of these gears 49 and 50 is selected such that the driven gear may be acceleratedly driven by the drive gear 49. The front wheel brake 3 is constituted of an annular brake disc 12 and a brake caliper 13 straddling over the brake disc 12 from its inner periphery side. The brake disc 12 is secured at its outer portion by bolts 100 to arms 99 projecting from the outer peripheral side surface of the bowl-shaped arm 2a. The brake caliper 13 is carried on a bracket 14 secured through a pair of slide pins 102 to an arm 80b projecting from a side surface of the bottom case 80 for sliding movement in the axial direction of the brake disc 12. The brake caiper 13 can operate upon the reception of the output hydraulic pressure from the master cylinder 5 to clamp the brake disc 12 with a pressure, thus causing a braking force to be applied to the front wheel 2.

Figure 3:
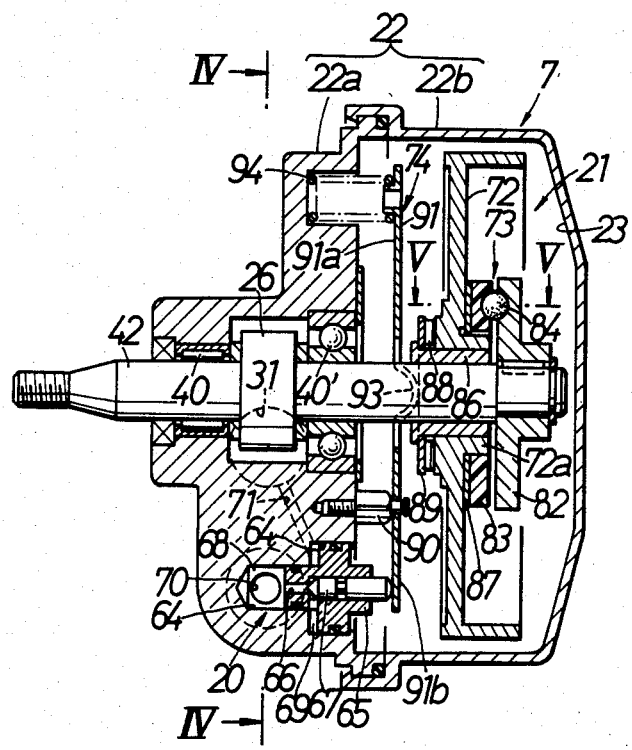
Figure 4:
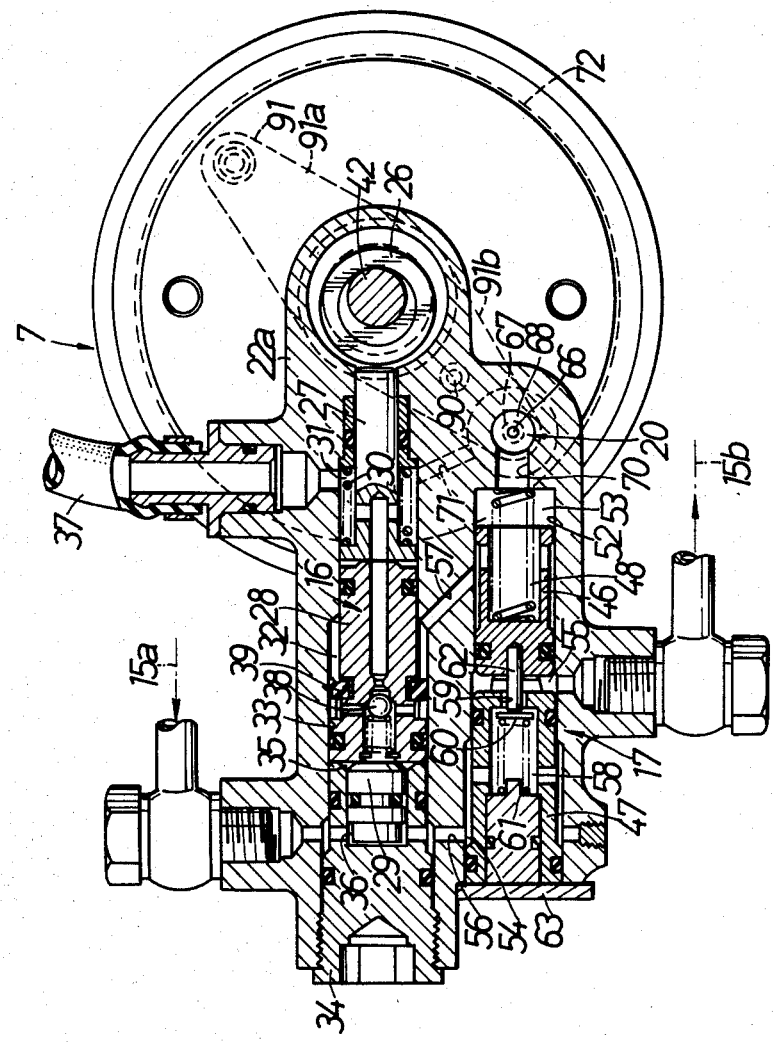

A illustrated in FIG. 3 and FIG. 4, the antilock control unit 7 has a casing 22 constituted of a casing body 22a bearing the drive shaft 42 rotatably through bearings 40, 40', and a cup-like cover 22b fitted in one end of the casing body 22a and defining a sensor chamber 23 therewith. A hydraulic pump 16, a modulator 17, an exhaust pressure valve 20 and an inertia type wheel angular deceleration sensor 21 are housed in the casing 22.

The hydraulic pump 16 is constituted of an eccentric cam 26 formed on the drive shaft 42 between both the bearings 40, 40', a push rod 27 disposed with its inner end opposed to the eccentric cam 26, a pump piston 28 in contact with an outer end of the push rod 27, an actuating piston 29 in contact with an outer end of the pump piston 28, and a return spring 30 biassing a push rod 27 in the direction away from the eccentric cam 26.

The push rod 27 and the pump piston 28 are slidably fitted in a first cylinder hole 33 formed on the casing body 22a to define an inlet chamber 31 and an outlet chamber 32 around their outer peripheries respectively. Further, a plug 34 is fitted to an outer end portion of the first cylinder hole 33 so as to form a pump chamber 35 together with the pump piston 28, and the actuating piston 29 is slidably fitted in the plug 34 so as to form a hydraulic chamber 36.

The inlet chamber 31 is kept communicating with an oil tank 19 through a conduit 37 and also with the pump chamber 35 through a suction valve 38, and the pump chamber 35 is kept communicating with the outlet chamber 32 through a unidirectional sealing member 39 functioning as a discharge valve. Then, the hydraulic chamber 36 is connected to an upstream pipe 15a of the hydraulic conduit 15 so as to communicate at all times with the output port 5a of the master cylinder 5.

The modulator 17 is constituted of a pressure reducing piston 46, a fixed piston 47 engageable with one end of the pressure reducing piston 46 to regulate the retraction limit of the latter, and a return spring 48 for biassing the piston 46 in the direction to contact the fixed piston 47, and both the pistons 46, 47 are slidingly fitted in a second cylinder hole 52 formed on the casing body 22a adjacently the first cylinder hole 33.

In the second cylinder hole 52, the pressure reducing piston 46 defines a hydraulic control chamber 53 together with an inner end wall of the second cylinder hole 52 and also defines an output hydraulic chamber 55 against the fixed piston 47, and the fixed piston 47 defines an input hydraulic chamber 54 around its outer periphery. The input hydraulic chamber 54 is kept communicating with the hydraulic chamber 36 of the hydraulic pump 16 through an oil passage 56, the output hydraulic chamber 55 is connected to a downstream pipe 15b of the hydraulic conduit 15 so as to communicate at all times with the input port 3a of the disc brake 3, and the hydraulic control chamber 53 is kept communicating with the outlet chamber 32 of the hydraulic pump 16 through an oil passage 57.

The fixed piston 47 is provided with a valve chamber 58 communicating at all times with the input hydraulic chamber 54, and a valve port 59 for keeping the valve chamber 58 in communication with the output hydraulic chamber 55. A valve body 60 for opening and closing the valve port 59 and a valve spring 61 for pressing the valve body 60 to the closing side are enclosed in the valve chamber 58. Further, a valve opening rod 62 for moving the valve body 60 to an open position is provided projectingly on one end surface of the pressure reducing piston 46, and the valve opening rod 62 keeps the valve body 60 open when the pressure reducing piston 46 is positioned at the retraction limit.

An outside opening of the second cylinder hole 52 is closed by an end plate 63 fixed to the casing body 22a, and the fixed piston 47 is kept at a position coming in contact with the end plate 63 at all times by the resilience of the return spring 48 or by the hydraulic pressure introduced into the input and output hydraulic chambers 54, 55.

The exhaust pressure valve 20 is constituted of a valve seat member 65 fitted in a stepped cylinder hole 64 of the casing body 22a, and a valve body 67 which slides in the valve seat member 65 for opening and closing a valve port 66. The valve seat member 65 defines an inlet chamber 68 at the small diameter end of the stepped cylinder hole 64 and an outlet chamber 69 at the large diameter end, the chambers 68, 69 communicating with each other through the valve port 66. Then, the inlet chamber 68 is kept communicating with the hydraulic control chamber 53 of the modulator 17 through an oil passage 70, and the outlet chamber 69 is kept communicating with the inlet chamber 31 of the hydraulic pump 16 through an oil passage 71. As a result, the outlet chamber 69 communicates with the oil tank 19.

The wheel angular deceleration sensor 21 comprises a flywheel 72 borne rotatably and slidably on the drive shaft 42 through a bearing bush 86, a cam mechanism 73 transmitting the rotational torque of the drive shaft 42 to the flywheel 72 and transforming an overrunning rotation of the flywheel 72 into an axial displacement thereof, and an output lever mechanism 74 capable of actuating the exhaust pressure valve 20 in response to the axial displacement of the flywheel 72.

The cam mechanism 73 is constituted of a drive cam plate 82 fixed to the drive shaft 42, a driven cam plate 83 disposed opposite to the drive cam plate 82 for relative rotation, and a thrust ball 84 engaging with cam recesses 82a, 83a formed on opposed surfaces of both the cam plates 82, 83.

Figure 5:
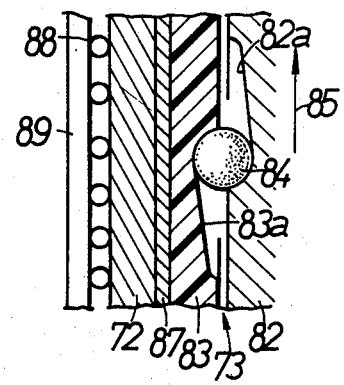

As shown in FIG. 5, the cam recess 82a of the drive cam plate 82 is inclined so that the bottom becomes increasingly shallower in a direction 85 of rotation of the drive shaft 42, and the cam recess 83a of the driven cam plate 83 is inclined so that the bottom becomes increasingly deeper toward the rotational direction 85. Accordingly, in a normal case the drive cam plate 82 assumes a driving side position in relation to the driven cam plate 83, the thrust ball 84 engages both the cam recesses 82a, 83a at their deepest portions, the torque receives by the drive cam plate 82 from the drive shaft 42 is transmitted only to the driven cam plate 83, so that relative rotation is not caused between the cam plates 82, 83. However, if the position is reversed and the driven cam plate 83 overruns the drive cam plate 82, relative rotation is caused between the cam plates 82, 83, the thrust ball 84 rolls to climb the inclined bottoms of both the cam recesses 82a, 83a to impart thrust to both the cam plates 82, 83, and thus axial displacement is caused on the driven cam plate 83 in a direction moving away from the drive cam plate 82.

The driven cam plate 83 is borne rotatably on a boss 72a of the flywheel 72 and also engages one side of the flywheel 72 through a frictional clutch plate 87. A push plate 89 is provided additionally on the other side of the flywheel 72 through a thrust bearing 88.

The output lever mechanism 74 is provided with a bearing shaft 90 projecting from the casing body 22a at a position intermediately of the drive shaft 42 and the exhaust pressure valve 20, and a lever 91 supported axially swingably on a nose portion of the bearing shaft 90. The lever 91 is constituted of a long first arm 91a extending from the bearing shaft 90 while surrounding the drive shaft 42, and a short second arm 91b extending from the bearing shaft 90 toward the exhaust pressure valve 20, and an abutment portion 93 coming into contact with an outside surface of the push plate 89 is formed bulgingly at an intermediate portion of the first arm 91a.

A spring 94 is provided between the tip end of the first arm 91a and the casing body 22a, and the tip end of the second arm 91b comes in contact with an outer end of the valve body 67 of the exhaust pressure valve 20.

The resilient force of the spring 94 works on the lever 91 to press the abutment portion 93 of the first arm 91a to the push plate 89 and also normally press the valve body 67 of the exhaust pressure valve 20 to keep it in open state. Then, the force received by the push plate 89 from the spring 94 imparts a constant frictional engaging force to the flywheel 72, the frictional clutch plate 87 and the driven cam plate 83 and also imparts an access force to both the cam plates 82, 83.

Further, the above frictional engaging force is set so that the frictional clutch plate 87 slides when a rotational torque on or above a given value is generated between the driven cam plate 83 and the flywheel 72.

An operation of the embodiment will be described next.

While a vehicle is travelling, the drive shaft 42 is acceleratedly driven by the rotating front wheel 2 through the transmission device 48, then the flywheel 72 is driven through the cam mechanism 73 and the frictional clutch plate 87 so that the flywheel 72 rotates faster than the front wheel 2. Accordingly, a large rotational force of inertia is given to the flywheel 72.

Then, the eccentric cam 26 of the hydraulic pump 16 is rotated through the drive shaft 42 simultaneously with the rotation of flywheel 72.

When the master cylinder 5 is actuated for braking the front wheel 2, its output hydraulic pressure is supplied to the disc brake 3 by way of the upstream pipe 15a of the hydraulic conduit 15, the hydraulic chamber 36 of the hydraulic pump 16, the input hydraulic chamber 54 of the modulator 17, the valve chamber 58, the valve port 59, the output hydraulic chamber 55 and the downstream pipe 15b of the hydraulic conduit 15 in that order, and the brake 3 is actuated accordingly to apply brake force to the front wheel 2.

On the other hand, since the output hydraulic pressure of the master cylinder 5 is introduced into the hydraulic chamber 36 in the hydraulic pump 16, a reciprocating motion is caused to the pump piston 28 according to a push action of the hydraulic pressure to the actuating piston 29 and a lift action of the eccentric cam 26 to the push rod 27. Further, in a suction stroke whereat the pump piston 28 is moved toward the push rod 27, the suction valve 38 opens, and an oil in the oil tank 19 is sucked into the pump chamber 35 from the conduit 37 by way of the inlet chamber 31; in a discharge stroke whereat the pump piston 28 is moved toward the actuating piston 29, the unidirectional sealing member 39 opens, and an oil in the pump chamber 35 is fed to the outlet chamber 32 and further to the hydraulic control chamber 53 through the oil passage 57. Then, when pressure in the outlet chamber 32 and the hydraulic control chamber 53 rises to a predetermined value, the pump piston 28 is held in contact with the plug 34 by the pressure of the outlet chamber 32.

The hydraulic control chamber 53 of the modulator 17 is at first interrupted from communicating with the oil tank 19 by closing of the exhaust pressure valve 20, therefore the hydraulic pressure fed from the hydraulic pump 16 to the chamber 53 works directly on the pressure reducing piston 46 to hold it at the retracted position, keeping the valve body 60 open by the valve opening rod 62. Thus the output hydraulic pressure of the master cylinder 5 is permitted to pass through the port 59.

Accordingly, brake force applied to the disc brake 3 is proportional to the output hydraulic pressure of the master cylinder 5 at initial stage of braking.

When angular deceleration is generated by the front wheel 2 owing to the braking operation, the flywheel 72 senses it and tends to overrun the drive shaft 42 by the stored inertial force in the flywheel 7. The relative movement of the flywheel 72 under this condition causes relative rotation between the cam plates 82, 83, to axially displace the flywheel 72 by the thrust generated by the rolling of thrust ball 84, forcing the plate 89 to press and move the lever 91. However, the angular deceleration of the front wheel 2 is low at a stage where there is no possibility of locking of the front wheel 2, which is not powerful enough to rock the lever 91.

However, when the front wheel 2 is about to lock according to an excessive brake force or a lowering in coefficient of friction of the road, the angular deceleration of the front wheel 2 sharply increases accordingly and a pressing force of the push plate 89 exceeds a predetermined value, swinging the lever 91 around the shaft 90 to compress the spring 94, therefore the second arm 91b of the lever 91 is swung to move apart from the valve body 67, and the exhaust pressure valve 20 consequently opens.

When the exhaust pressure valve 20 opens, the hydraulic pressure of the hydraulic control chamber 53 is discharged to the oil tank 19 by way of the oil passage 70, the inlet chamber 68, the valve port 66, the outlet chamber 69, the oil passage 71, the inlet chamber 31 of the hydraulic pump 16 and the conduit 37, therefore the pressure reducing piston 46 is moved toward the hydraulic control chamber 53 by the hydraulic pressure in the output hydraulic chamber 55 against a force of the return spring 48. The valve opening rod 62 is thus retreated to allow the valve body 60 to close the port 59 so that the input and output hydraulic chambers 54, 55 are interrupted from communicating with each other, and the volume of the output hydraulic chamber 55 is increased. A braking hydraulic pressure working on the disc brake 3 is reduced consequently to decrease the brake force of the front wheel 2, and locking of the front wheel 2 can be avoided. Then, a pressing force of the push plate 89 onto the lever 91 is released in accordance as the front wheel 2 is accelerated, the lever 91 swings and returns to its original position by a reaction force of the spring 94, thus placing the exhaust pressure valve 20 in closed state. When the exhaust pressure valve 20 is closed, pressure oil discharged from the hydraulic pump 16 is immediately confined in the hydraulic control chamber 53 and the pressure reducing piston 46 is retreated toward the output hydraulic chamber 55 to boost the chamber 55, thus recovering the brake power. This operation is repeated at high frequency and the front wheel 2 is braked efficiently.

In such a brake device, since the antilock control unit 7 and the transmission device 48 are contained in the recess 96 of the front wheel 2, the latter functions as covering means to diminish the influence of an external disturbance on the antilock control unit 7 and the transmission device 48.

In particular, since the recess 96 is defined on one side of the front wheel 2 by displacing the hub 2h of the front wheel 2 carried on the cantilever type front fork 9 on the side opposite to the fork leg 81 from the central rotational plane of the rim 2r, such recess can not be obstructed by the fork leg 81 in any way and can be of larger volume and therefore become easy to contain the antilock unit 7 and the transmission device 48.

Furthermore, the lateral balance in weight can be kept more reliably by disposing the antilock control unit 7 in the vicinity of the central rotational plane O of the rim 2r.

Figure 7:
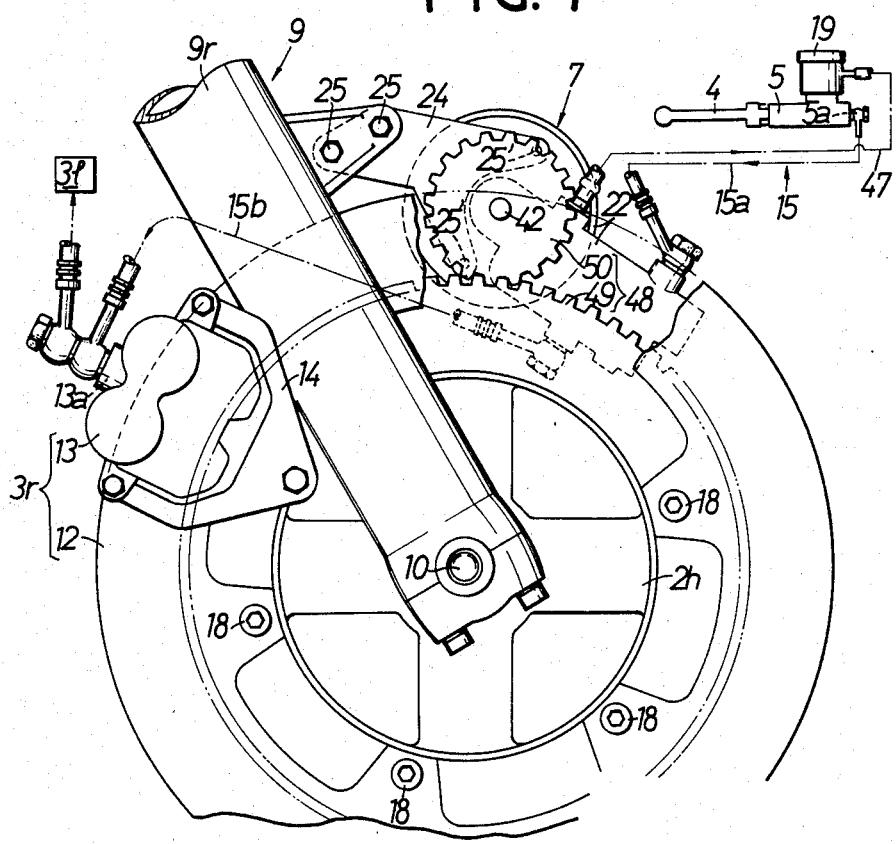
Figure 8:
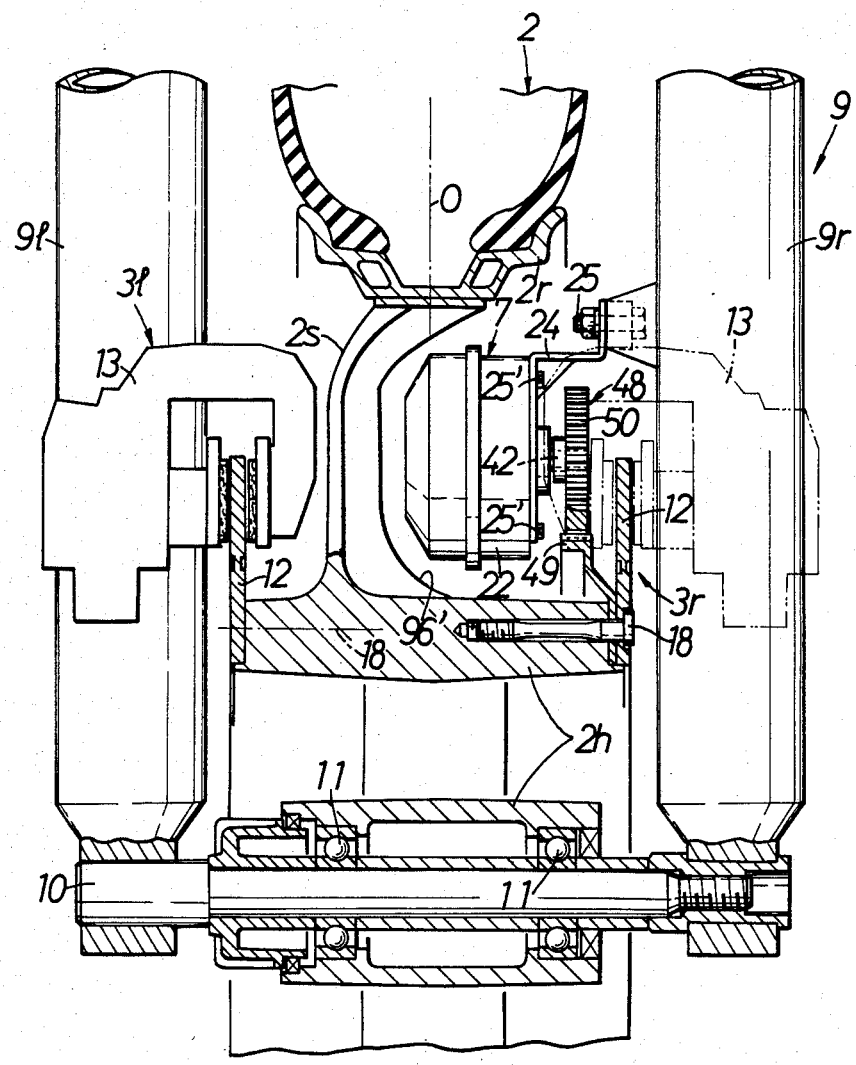

FIGS. 6, 7 and 8 illustrate another embodiment of the present invention, and in these Figures, the same reference numbers as in FIGS. 1 and 2 are used to denote the parts corresponding to those in the above embodiment.

Referring first to FIG. 6, a motorcycle M includes a pair of left and right disc brakes 3l and 3r for braking the front wheel 2, a master cylinder 5 adapted to be operated by a lever 4 for operating these disc brakes 3l and 3r, and an antilock control unit 7 for controlling the output hydraulic pressure from the master cylinder 5.

Referring to FIGS. 7 and 8, the front wheel 2 has a hub 2h, a rim 2r and a spoke 2s connecting the hub 2h and the rim 2r. The hub 2h is journaled through bearings 11 on an axle 10 which is secured at its opposite ends to a pair of left and right legs 9l and 9r constituting a front fork 9.

The spoke 2s is curved and integral with the hub 2h, with its central portion being displaced leftwards in FIG. 8 from the central rotational plane O of the rim 2r of the front wheel 2. The hub 2h, rim 2r and spoke 2s define a relatively deep annular recess 96' which is opened on the right side of the wheel 2.

Contained in the annular recess 96' are an antilock control unit 7 as described above and a transmission device 48 connecting the drive shaft 42 of the unit 7 and the hub 2h. The antilock control unit 7 has a casing 22 which is secured by bolts 25' to a bracket 24 securely mounted on the right leg 9r by bolts 25.

The pair of disc brakes 3l and 3r each is comprised of a brake disc 12 secured to the end surface of the hub 2h by bolts 18 and a brake caliper 13 carried straddling the brake disc 12 on the leg 9l or 9r through a bracket 14. In this case, particularly the right brake disc 12 is disposed rising in the inlet of the annular recess 96' to cover the outer side surfaces of the antilock control unit 7 and transmission device 48.

In such a brake device, since the antilock control unit 7 and transmission device 48 are contained in the annular recess 96' defined on one side of the front wheel 2 and their outer sides are covered with the right brake disc 12, a less portion of the front wheel 2 is projected outside, so that a wholly compact brake device is attained, while at the same time, the influence of an external disturbance of rainwater or the like on the antilock control unit 9 and the transmission device 48 is suppressed by the front wheel 2 and the brake disc 12.

In addition, the antilock control unit 7 contained in the annular recess 96' is extremely close to the central rotational plane O of the front wheel 2, and the lateral balance in weight of the support system for the front wheel, i.e., the front fork 9 can be improved, thus insuring a good steerability.

What is claimed is:

1. A brake device for vehicles comprising a master cylinder, a wheel brake adapted to be operated by an output hydraulic pressure from said master cylinder to apply a braking force to a wheel, and an antilock control unit provided therewith an inertia type wheel angular deceleration sensor driven by said wheel through a transmission device and adapted for controlling the output hydraulic pressure from said master cylinder in accordance with an output generated from said sensor, said antilock control unit being carried on a support system for said wheel, wherein on one side of said wheel is defined a recess which is concave toward the other side of said wheel from a central rotational plane of a rim of the wheel, and wherein said antilock control unit and transmission device are disposed in said recess.

2. A brake device for vehicles according to claim 1, wherein at least said antilock control unit is disposed in the vicinity of the central rotational plane of the rim.

3. A brake device for vehicles according to claim 1, wherein said support system is of a cantilever type to supporting an axle of said wheel only at one end thereof.

4. A brake device for vehicles comprising a master cylinder, a wheel brake adapted to be operated by an output hydraulic pressure from said master cylinder to apply a braking force to a wheel, and an antilock control unit provided therewith an inertia type wheel angular deceleration sensor driven by said wheel through a transmission device and adapted for controlling the output hydraulic pressure from said master cylinder in accordance with an output generated from said sensor, said antilock control unit being carried on a support system for said wheel, wherein on one side of said wheel is defined a recess which is concave toward the other side of said wheel from a central rotational plane of a rim of the wheel, wherein said antilock control unit and transmission device are disposed in said recess wherein said support system is of a cantilever type supporting an axle of said wheel only at one end thereof, and wherein said wheel has a hub displaced toward one side of the wheel opposite to the support system from the central rotational plane of the rim to define said recess on the one side of the wheel.

5. A brake device for vehicles comprising a master cylinder, a wheel brake adapted to be operated by an output hydraulic pressure from said master cylinder to apply a braking force to a wheel, and an antilock control unit provided therewith an inertia type wheel angular deceleration sensor driven by said wheel through a transmission device and adapted for controlling the output hydraulic pressure from said master cylinder in accordance with an output generated from said sensor, said antilock control unit being carried on a support system for said wheel, wherein on one side of said wheel is defined a recess which is concave toward the other side of said wheel from a central rotational plane of a rim of the wheel, wherein said antilock control unit and transmission device are disposed in said recess, and wherein said wheel brake is a disc brake, and said wheel has a hub and a spoke, and recess being defined by the hub, rim and spoke of the wheel, and wherein said disc brake has a brake disc secured to an end of said hub in a manner to cover an outer side surface of said antilock control unit contained in said recess.

* * * * *